Dec. 10, 1968 S. L. L. CAILLIOT 3,415,525

DEVICE FOR RECORDING AND READING OF A HELICOIDAL SUPPORT TAPE

Filed Nov. 10, 1966 2 Sheets-Sheet 1

Serge Leon Louis Cailliot,
Inventor

Browne, Schuyler & Beveridge
attys.

Serge Leon Louis Cailliot
Inventor
Browne, Schuyler & Beveridge
Attys.

United States Patent Office 3,415,525

Patented Dec. 10, 1968

3,415,525
DEVICE FOR RECORDING AND READING OF A HELICOIDAL SUPPORT TAPE

Serge Leon Louis Cailliot, 38 Rue du Bois de Boulogne, Neuilly-sur-Seine, France Filed Nov. 10, 1966, Ser. No. 593,438
Claims priority, application France, Nov. 15, 1965, 38,448
10 Claims. (Cl. 274—4)

ABSTRACT OF THE DISCLOSURE

A helicoidal recording tape mounted on a fixed drum enclosed by a cover, a base, and an annular drive element located between the cover and base. The opposite ends of the tape form loops interconnected by a portion of the tape which extends through the drum. To guide the end coils of the tape in planes generally perpendicular to the helicoidal axis of the tape, two pairs of end plates are fixed at opposite ends of the drum with portions of the tape passing between the end plates by means of apertures in the latter. Magnet heads are received through overlying apertures formed in the cover and the adjacent end plate to be engageable with the tape as it is driven through apertures in its periphery which receive projections on the annular drive element.

The present invention broadly relates to sound and image recording devices of the type disclosed in U.S. Patent No. 3,095,200, wherein a helicoidal support in the form of an endless strip has an internal connection between the two end coils thereof, which connection is by means of an auxiliary helicoid of lesser diameter. In FIGURES 12 and 13 of said patent, a supply cartridge permitting continuous unreeling of the support strip, is provided with an annular drive element seated inside two casing halves, and actuated by a roller passing through the said casing halves. The said cartridge also includes a central seat for the above mentioned auxiliary helicoid.

In contrast the present invention relates to a novel method of recording and also a novel supply cartridge of simplified construction in which the end coils of a helicoidal support strip or tape are joined by two loops formed at the end coils and interconnected by a tape portion passing through a central passage formed by the wound-up support tape. The cartridge can drive the support tape in rotation in either direction and is characterized in that the annular drive element meshing with external notchings on the helicoidal support drive same also constitutes the external part of the said supply cartridge. The base of the supply cartridge is fixed and in certain cases can be rigidly joined, with the said annular drive element or with a fixed cover of the same shape as the said base and symmetrical therewith, the said cover being rigidly joined with two pairs of horizontal end plates that are fixed to the spool core to receive the opposite end coils of the support tape.

Openings are provided in said cover and in the underlying end plate to permit passage of a drive shaft for the movable part of said cartridge and the seat of one or more magnetic heads serving respectively for erasing, recording and reproduction.

The novel supply cartridge of the invention presents two external end plates which are respectively adjacent to the base and the cover of the said cartridge and ensure guidance of the end coils of the tape toward the central passage defined by the tape. The interior of the spool is suitably apertured to accommodate the interconnecting portion of the tape. Adequate space is left between the base and cover and the adjacent end plates so that the ends of the external coils will not rub against the base or the cover.

The features of the present invention will be better understood in reading the description that follows concerning two embodiments of cartridges of the invention, the said embodiments being presented as non-limitative examples and described with reference to the attached drawing in which.

Figure 1:
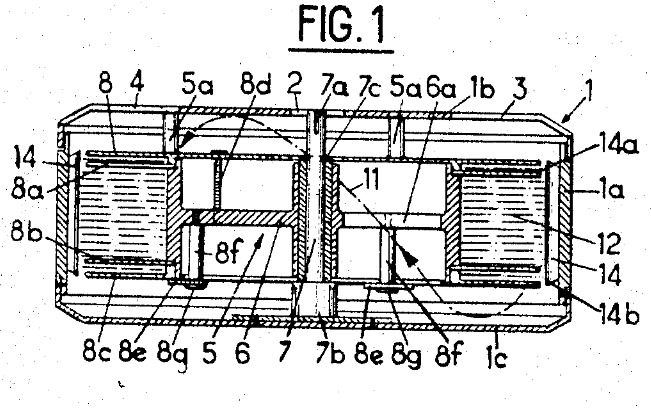
FIGURE 1 shows a diametrical section of a cartridge embodying the invention.

In FIGURE 1 it is to be noted that case 1 is constituted by a cylindrical element **1*a*, a base 1*c* which is integral with the cylindrical drive element 1*a*, and a removable cover 1*b* in which there is a central opening 2 that allows passage of a milled drive shaft that may drive base 1*c* and the cylindrical drive element 1*a*. Cover 1*b* also presents two openings 3 and 4 for the passage of two magnetic heads (not shown). Cover 1*b* also presents three holes for the passage of pins for securing the cover to the end plates mounted on the core of spool 5, the pins being threaded in posts 5*a*** that are integral with the upper end plate of the spool.

The spool comprises a core 6 whose horizontal midportion is provided with an opening **6*a* for passage of the connecting loop between the two end coils of the support strip or tape 11 mounted in the cartridge. Core 6 turns around shaft 7 whose milled end may be engaged by a drive element such as by placing the cartridge on a fixed annular plate with cover 1*b* turned downward in contact with the plate. Shaft 7, rigidly connected at 7*b* with base 1*c*, thus drives the base as well as annular element 1*a*, cover 1*b*** being stationary.

Core 6 is retained longitudinally on shaft 7 by a keeper **7*c*. End plates 8, 8*a*, 8*b* and 8*c* are fixed on core 6, the upper plates 8 and 8*a* by means of screw 8*d*, and the lower plates 8*b* and 8*c* by means of tabs 8*e*, crosspieces 8*f* and screws 8*g***.

Figure 3:
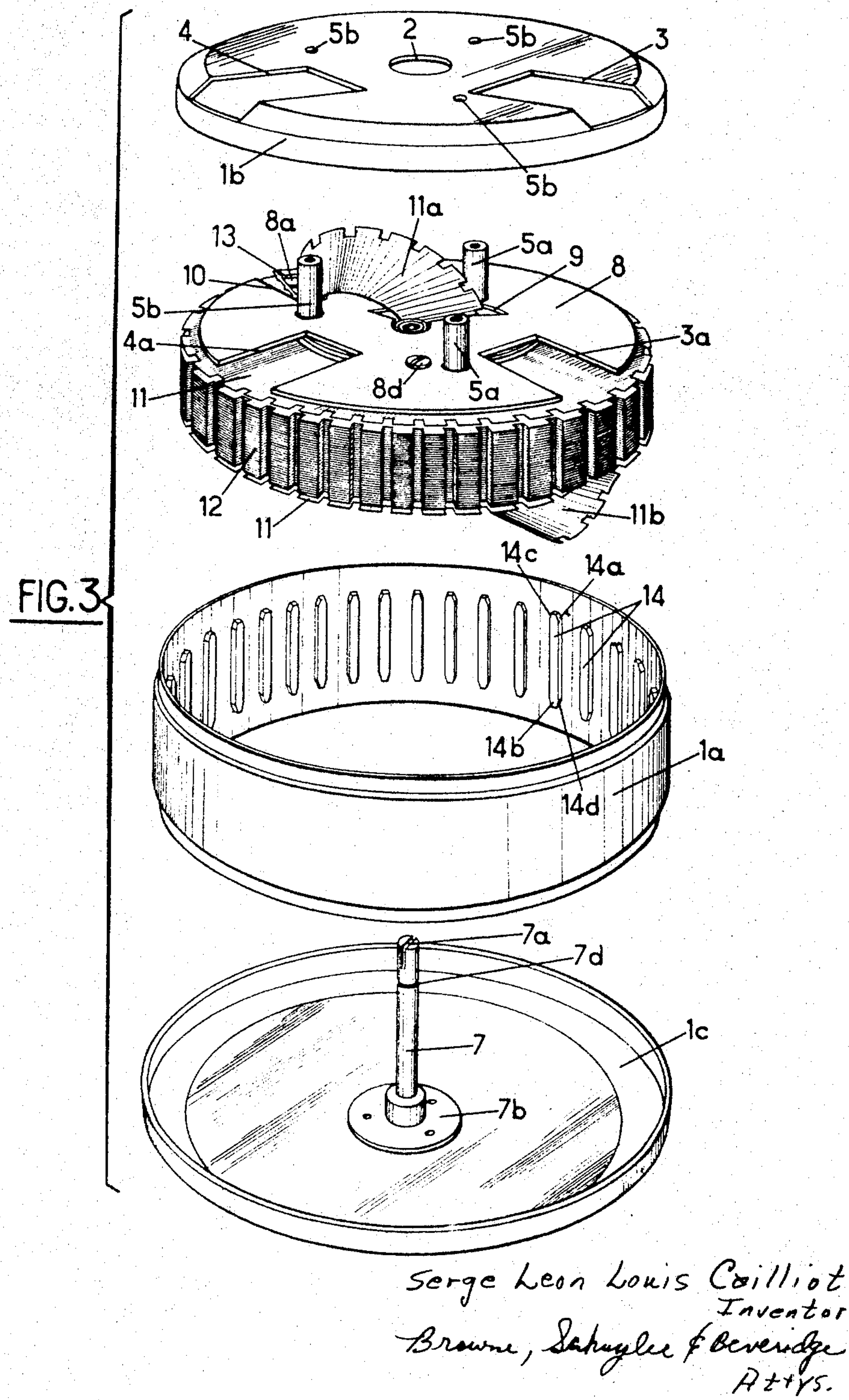
FIGURE 3 is an exploded perspective view of the supply cartridge unit.

If reference is made to FIGURE 3, two apertures **3*a* and 4*a* are observed in upper end plate 8, corresponding to openings 3 and 4 of cover 1*b*. Two felt skids, of any suitable type (not shown in the drawings) are provided on plate 8*a* to apply the support strip against the magnetic heads at the level of these openings. FIGURE 3 also shows that upper plate 8 has two openings 9 and 10 which allow passage of support strip 11 in the form of a loop 11*a*. FIGURE 3 further illustrates the three posts 5*a* cooperating with the said screws to consolidate cover 1*b* with core 6. Moreover, FIGURE 3 shows part 13, curved upward, of plate 8*a*, which is opposite opening 10 of plate 8, below which support strip 11 descends to join the other coils of the wound-up support strip visible at 12. Opening 9 of plate 8 is beveled, to avoid any possibility of tearing loop 11*a***.

For driving the support strip, there are provided on the internal wall of the cylindrical element **1*a* a plurality of drive protuberances 14 dimensioned to engage the notches in support strip 11**.

The special double bevel toward the top and bottom of drive protuberances 14 is to be noted. Bevels **14*a* and 14*b* are parallel and have an inclination differing from that of parallel bevels 14*c* and 14*d* so as to facilitate the disengagement of the support strip at the level of the openings in end plates 8 and 8*c*, no matter which may be the direction of rotation of annular element 1*a***.

Figure 2:
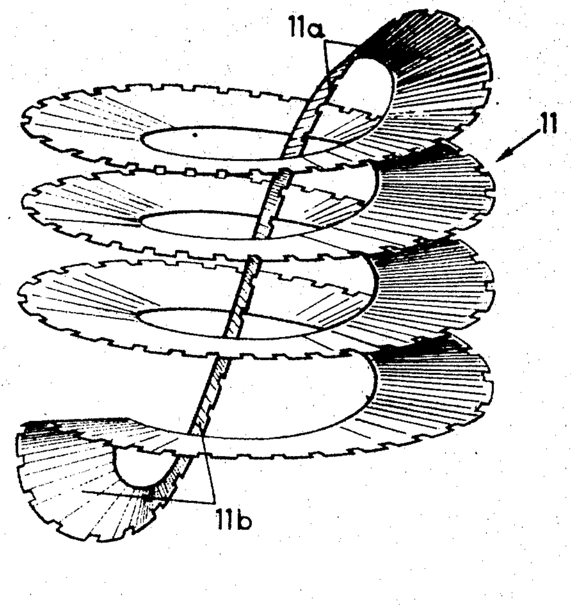
FIGURE 2 shows a view of a support strip that can be utilized in combination with a supply cartridge of the above mentioned type.

Support strip 11 is shown schematically in FIGURE 2, as well as loop 11*a* between plate 8 and the cover, and loop 11*b* which is symmetrical to loop 11*a* and which forms the lower part of support strip 11 between the base of the cartridge and lower end plate 8*c*. As shown in FIGURE 3, support strip loop 11*a* passes between end plates 8 and 8*a* while loop 11*b* passes between end plates 8*b* and 8*c*.

With reference to FIGURE 3, cover 1*b* has a central opening 2, two openings 3 and 4 for seating magnetic heads, and three holes 5*b* for passage of screws cooperating with posts 5*a* mounted on end plate 8. FIGURE 3 also clearly shows the annular drive member 1*a* with its interior drive protuberances 14, shaft 7 with drive slit 7*a* and a construction 7*d* for seating keeper 7*c*, as well as retaining plate 7*b* on base 1*c*.

FIGURE 3 also shows ribs 13 on end plate 8*a*, to reduce accumulations of static charges by friction of the support strip. Similar ribs are also provided on plates 8*b* and 8*c*. End plates 8 and 8*c* have collars at the interior (collars not illustrated) which elements permit assembly with core 6. Of course, sufficient play is left toward the inside of wound-up support strip 12 with reference to the periphery of core 6.

In a modification not shown in the drawing, angular element 1*a* is independent not only of cover 1*b* but also of the cartridge base, said base and cover then both being integral with the fixed core and the respective end plates 8, 8*a*, 8*b* and 8*c*, the mounting of the said core then being somewhat different. In this modification annular element 1*a* can be driven in rotation at its periphery by any suitable means such as a windlass device. Moreover in this form, annular element 1*a* is mounted on balls to prevent substantial friction against fixed cover 1*c* and base 1*d*.

It is understood that various other changes, improvements and modifications can be made in the embodiments described, or that certain elements may be replaced by equivalent elements without departing from the concept and scope of the present invention.

I claim:

1. A recording device comprising in combination, a helicoidal support tape wound in helical fashion to define a central passage and with the opposite ends of the support tape being interconnected by loops projecting from the opposite end coils and a portion interconnecting the loops and extending through the central passage, a cartridge for said support tape, the cartridge including a fixed cover, a spool received in said central passage with the internal edge of the support tape extending about the periphery of said spool, means rigidly connecting said spool to said cover, said spool including two pairs of superposed end plates fixedly positioned generally at the opposite ends of said support tape with the opposite end coils of the support tape received between the plates of each pair respectively to guide the end coils of the tape in planes generally perpendicular to the axis of said central passage, the two intermediately positioned plates having apertures for passage and guidance of the support tape, the outer end plate each having a pair of apertures offset from the apertures of the intermediately positioned plates for receiving spaced portions of the opposite end coils of the support tape to form said loops, said cover and the underlying end plate having apertures intermediate the offset apertures in the adjacent end plate and intermediately positioned plate for receiving magnet heads for recording, reproduction or the like with the tape passing through the aperture in the intermediately positioned plate across the magnetic head and then through the offset aperture in the end plate, an annular drive element surrounding said spool and tape and being rotatable with respect to said fixed cover and said spool, said annular drive element having projections on the internal surface thereof engageable in notches of said tape to drive the tape, and a base positioned on the side of said spool opposite the cover, said base being rigidly fixed to one of said cover and annular drive element.

2. The device defined in claim 1 wherein the spacing between the opposite end plates and the cover and base respectively is sufficient to avoid any frictional contact between the connecting loops and the cover and base.

3. The device defined in claim 1 wherein said spool has an internal passage for receiving the loop which connects the opposite coils of said support tape.

4. The device defined in claim 1 wherein said annular drive element is rigidly fixed to said base at the periphery of said base to enclose the tape and spool, and wherein said device further includes a shaft fixed to and extending perpendicularly from said base, said spool having a central passage receiving said shaft, and said cover having a central passage about the free end of said shaft permitting driving connection between the free end of said shaft and a drive member located adjacent said cover.

5. The device defined in claim 4 wherein said annular drive element is generally cylindrical and also forms a portion of the housing of the device.

6. The device defined in claim 1 wherein said cover is fixed to the underlying end plate and wherein said last recited end plate is fixed to said spool, and wherein the intermediately positioned end plates are fixed generally at the periphery of said spool.

7. The device defined in claim 1 wherein the intermediately positioned end plate closest to said cover has felt skid means at the level of said last mentioned apertures.

8. The device defined in claim 1 wherein said base is rigidly fixed to said end plates and said cover, and wherein said annular drive element is rotatable relative to said base and cover, and wherein there is provided anti-friction ball means between the edges of the annular drive element and the adjacent edges of said cover and base.

9. The device defined in claim 1 wherein a number of said end plates are ribbed to limit their contact surface with the support tape.

10. The device defined in claim 1 wherein said drive projections on said annular drive element extend generally axially along the annular drive element with the opposite ends of each projection being beveled.

References Cited

UNITED STATES PATENTS

| | | |
|---|---|---|
| 3,075,200 | 6/1963 | Cailliot. |
| 2,990,182 | 6/1961 | Cailliot. |

LEONARD FORMAN, *Primary Examiner.*

R. A. FIELDS, *Assistant Examiner.*